US009537690B1

United States Patent
Timm et al.

(10) Patent No.: US 9,537,690 B1
(45) Date of Patent: Jan. 3, 2017

(54) METHOD AND APPARATUS FOR EXTRACTION OF BASEBAND WAVEFORM FROM AMPLITUDE MODULATED SIGNAL VIA TIME DOMAIN SAMPLING

(71) Applicant: Keysight Technologies, Inc., Minneapolis, MN (US)

(72) Inventors: Daniel P. Timm, Colorado Springs, CO (US); Steven J. Pelelo, Colorado Springs, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/796,144

(22) Filed: Jul. 10, 2015

(51) Int. Cl.
*H03D 1/24* (2006.01)
*H04L 27/06* (2006.01)
*H04L 27/26* (2006.01)

(52) U.S. Cl.
CPC .......... *H04L 27/06* (2013.01); *H04L 27/2695* (2013.01)

(58) Field of Classification Search
CPC ..... H04L 27/2627; H04L 27/265; G05B 19/31
USPC .................. 375/320, 300; 327/551
See application file for complete search history.

(56) References Cited

U.S. PATENT DOCUMENTS

| 4,271,486 A | 6/1981 | Dagostino et al. |
| 4,564,823 A | 1/1986 | Stahler |
| 5,097,222 A | 3/1992 | Dent |
| 6,344,844 B1 | 2/2002 | Timm et al. |
| 6,990,416 B2 | 1/2006 | Kobalka et al. |
| 7,215,723 B2 | 5/2007 | Rizzo et al. |
| 2009/0203345 A1* | 8/2009 | Sorrells .............. H03C 1/62 455/313 |
| 2013/0207641 A1* | 8/2013 | Timm ............... G01R 13/0272 324/121 R |
| 2013/0329832 A1* | 12/2013 | Morita .............. H04B 1/0475 375/296 |

FOREIGN PATENT DOCUMENTS

| GB | 2057700 A | 4/1981 |
| GB | 2059229 A | 4/1981 |

* cited by examiner

*Primary Examiner* — Khai Tran

(57) ABSTRACT

A measurement apparatus, for example a digital oscilloscope, receives an amplitude modulated (AM) signal comprising a baseband signal, having a baseband waveform, modulating a carrier signal, and reconstructs the baseband waveform. The measurement apparatus: samples the AM signal at a sampling rate which produces a plurality of data samples for each period of the carrier signal; determines the amplitude of the baseband signal for each of a plurality of periods of the carrier signal from at least some of the plurality of data samples for each period; and reconstructs the baseband waveform from the amplitudes of the baseband signal for each of the plurality of periods of the carrier signal. The measurement apparatus may display the reconstructed baseband waveform on a display device.

26 Claims, 12 Drawing Sheets

METHOD AND APPARATUS FOR EXTRACTION OF BASEBAND WAVEFORM FROM AMPLITUDE MODULATED SIGNAL VIA TIME DOMAIN SAMPLING

BACKGROUND

Many communication signals are composed of a carrier signal, often operating at an RF or microwave carrier frequency, which is modulated with a baseband signal which conveys the real information in the communication signal. One well known example of such a communication signal is an amplitude modulated (AM) signal, wherein the baseband signal modulates the amplitude of the carrier signal.

FIG. 1A illustrates an example embodiment of an apparatus 100 for producing an AM signal. Apparatus 100 includes a carrier signal generator 110, a baseband signal generator 120, and an AM modulator 130.

Carrier signal generator 110 generates a carrier signal 115, in particular a periodic signal (e.g., a sine wave) having a carrier frequency. In various embodiments, carrier signal generator 110 may comprise an oscillator, a frequency synthesizer, or a waveform generator.

Baseband signal generator 120 in general can be any kind of device which generates a baseband signal 125 which can be used to modulate the amplitude of carrier signal 115. In some embodiments, baseband signal 125 may comprise a digital signal, or low-pass-filtered digital signal, in which case baseband signal generator 120 may be any kind of digital signal generator.

AM modulator 130 receives carrier signal 115 and modulated the amplitude of carrier signal 115 with baseband signal 125.

FIG. 1B illustrates another example embodiment of an apparatus 100 for producing an AM signal. In apparatus 150, baseband signal generator 120 provides baseband signal 125 to carrier signal generator 110 and the amplitude modulation is performed directly at carrier signal generator 110 such that no separate AM modulator is required.

FIG. 2 illustrates an example embodiment of an amplitude modulation (AM) signal 135, and FIG. 3 illustrates an example embodiment the frequency spectrum of an AM signal. In FIGS. 2 and 3, baseband signal 125 is a periodic signal having a frequency which is less than the carrier frequency. However, in general baseband signal 125 may be any arbitrary signal. However, in general, the highest frequency component of baseband signal 125 should be less than the carrier frequency of carrier signal 115, and is often much less than carrier frequency (e.g., by one or more orders of magnitude).

At a communication receiver, an AM signal may be demodulated to extract the baseband signal containing the information which is communicated. There are many well-known techniques for extracting the baseband signal by performing frequency domain signal processing of the AM signal. Perhaps the most common AM demodulator consists of a rectifier followed by a low pass filter. The operation of such an AM demodulator may be easily understood with reference to the frequency spectrum. The rectifier effectively squares the AM signal and thereby reproduces copies of the AM signal spectrum around twice the carrier frequency and also around DC or 0 Hertz. The output of the rectifier at twice the AM carrier frequency is removed by the low pass filter, leaving only the portion around 0 Hertz—which has the same spectrum as the original baseband signal.

Often a communication device or system which employs AM, or the AM signal itself, needs to be tested and analyzed. In particular, often it is necessary for a test instrument to extract the baseband signal from an AM signal which is being analyzed. This may include displaying the baseband waveform of the baseband signal to an engineer or technician who is analyzing the AM signal, or evaluating the performance of a device or system which generated or employs the AM signal.

Frequently, a digital oscilloscope is the primary, or only available, test instrument to test and analyze such an AM signal, or the device or system which generates or employs the AM signal.

However, in general, a digital oscilloscope does not include the frequency domain hardware (e.g., a rectifier) to perform efficient frequency domain signal processing of the AM signal to recover the original baseband signal.

Many modern digital oscilloscopes do include powerful mathematics and digital signal processing capabilities. The original baseband signal can be recovered from an AM signal using frequency domain digital signal processing techniques such as Fast Fourier Transforms (FFTs) and the Hilbert transform. Another technique involves tasking the square or absolute value of the AM signal, and passing the resultant signal through a low pass filter to remove the carrier. In the case where the square of the AM signal is employed, the square root of the output of the low pass filter should be obtained.

All of the above-described techniques for processing the AM signal by a digital oscilloscope tend to be computationally intensive and can take a long time to extract the baseband signal. Compounding this is a growing need to analyze long time windows to understand complex system behavior, including for example initialization and handshaking. This can require processing a large amount of data.

Thus it would be desirable to provide a more convenient and more reliable method and system to measure and characterize an electrical system or network which employs amplitude modulation.

SUMMARY

According to one aspect of the invention, a method comprises: receiving an amplitude modulated (AM) signal comprising a baseband signal, having a baseband waveform, modulating a carrier signal; sampling the AM signal at a sampling rate which produces a plurality of data samples for each period of the carrier signal; determining an amplitude of the baseband signal for each of a plurality of periods of the carrier signal from at least some of the plurality of data samples for each period; and reconstructing the baseband waveform from the amplitudes of the baseband signal for each of the plurality of periods of the carrier signal.

In some embodiments, the method also includes displaying the reconstructed baseband waveform on a display device.

In some embodiments, the method includes determining an amplitude of the baseband signal for each of the plurality of periods of the carrier signal comprises determining at least one of a peak data sample value and a nadir data sample value for each of the plurality of periods of the carrier signal.

In some versions of these embodiments, the step of determining at least one of a peak data sample value and a nadir data sample value for each of the plurality of periods of the carrier signal comprises determining the peak data sample value by: (1) determining a maximum data sample value among the data samples within a window comprising a percentage of the data samples for one of the periods of the carrier signal; (2) moving the window within the period and repeating step (1) so long as all data sample values are greater than a DC value of the AM signal; and (3) determining the peak data sample value for the period as the greatest of the maximum data sample values from steps (1) and (2).

In some versions of these embodiments, the method further comprises moving the window to the next period and repeating steps (1) through (3) for the next period.

In some versions of these embodiments, the step of determining at least one of a peak data sample value and a nadir data sample value for each of the plurality of periods of the carrier signal comprises determining the nadir data sample by: (1) determining a minimum data sample value among the data samples within a window comprising a percentage of the data samples for one of the periods of the carrier signal; (2) moving the window within the period and repeating step (1) so long as all data sample values are less than a DC value of the AM signal; and (3) determining the nadir data sample value for the period as the least of the minimum data sample values from steps (1) and (2).

In some versions of these embodiments, the method further comprises moving the window to the next period and repeating steps (1) through (3) for the next period.

In some versions of these embodiments, the step of determining at least one of a peak data sample value and a nadir data sample value for each of the plurality of periods of the carrier signal comprises determining both the peak data sample and the nadir data sample by: (1) determining a maximum data sample value and a minimum data sample value among the data samples within a window comprising a percentage of the data samples for one of the periods of the carrier signal; (2) moving the window within the period and repeating step (1); (3) determining the peak data sample value for the period as the greatest of the maximum data sample values from steps (1) and (2); and (4) determining the nadir data sample value for the period as the least of the minimum data sample values from steps (1) and (2).

In some versions of these embodiments, the method further comprises moving the window to the next period and repeating steps (1) through (3) for the next period.

In some embodiments, determining an amplitude of the baseband signal for each of the plurality of periods of the carrier signal comprises: determining a peak data sample value and a nadir data sample value for each of the plurality of periods of the carrier signal; determining a peak-to-peak amplitude of the AM signal in each period as a difference between the peak data sample value and the nadir data sample value; and determining the amplitude of the baseband signal in each period as ½ of the peak-to-peak amplitude of the AM signal in each period.

In some embodiments, determining an amplitude of the baseband signal for each of the plurality of periods of the carrier signal comprises: measuring the carrier frequency from the AM signal; determining a peak data sample value for a first one of the periods of the carrier signal; and sampling the AM signal at a plurality of times each corresponding to an integer number of periods after a time of the peak data sample value for the first one of the periods.

In some embodiments, determining an amplitude of the baseband signal for each of a plurality of periods of the carrier signal comprises determining a root mean square (RMS) value of the samples in each of the plurality of periods of the carrier signal, and determining the amplitude of the baseband signal based on the RMS value.

In some embodiments, determining an amplitude of the baseband signal for each of a plurality of periods of the carrier signal comprises, for at least some of the periods when the amplitude of the baseband signal is less than a threshold value: sampling the AM signal one carrier period away from another time when the AM signal is sampled, to produce an extrapolated data sample, and employing the extrapolated data samples to determine the amplitude of the baseband signal for the periods when the amplitude of the baseband signal is less than the threshold value.

According to another aspect of the invention, an apparatus comprises: a digitizer configured to receive an amplitude modulated (AM) signal comprising a baseband signal, having a baseband waveform, modulating a carrier signal, and further configured to sample the AM signal at a sampling rate to produce a plurality of data samples for each period of the carrier signal; and a signal processor configured to determine an amplitude of the baseband signal for each of a plurality of periods of the carrier signal from at least some of the plurality of data samples for each period, and to reconstruct the baseband waveform from the amplitudes of the baseband signal for each of the plurality of periods of the carrier signal.

In some embodiments, the digitizer comprises an analog-to-digital converter.

In some versions of these embodiments, the apparatus further comprises at least a first memory device configured to store the data samples output by the digitizer, wherein the signal processor is configured to retrieve the data samples from the memory for processing by the signal processor to determine the amplitude of the baseband signal for each of the plurality of periods of the carrier signal.

In some versions of these embodiments, the apparatus further comprises a second memory device configured to store display data representing the reconstructed baseband waveform; and a display device configured to display the reconstructed baseband waveform.

In some versions of these embodiments, the signal processor includes: an acquisition memory manager configured to manage the first memory device; and a processing unit configured to process the data stored in the second memory device for display by the display device.

In some versions of these embodiments, the signal processor comprises at least one of: a central processing unit (CPU) and an associated memory configured to store instructions to cause the CPU to execute an algorithm, the algorithm comprising: determining an amplitude of the baseband signal for each of a plurality of periods of the carrier signal from at least some of the plurality of data samples for each period; reconstructing the baseband waveform from the amplitudes of the baseband signal for each of the plurality of periods of the carrier signal; and an integrated circuit configured to determine an amplitude of the baseband signal for each of a plurality of periods of the carrier signal from at least some of the plurality of data samples for each period, and to reconstruct the baseband waveform from the amplitudes of the baseband signal for each of the plurality of periods of the carrier signal.

In some versions of these embodiments, determining an amplitude of the baseband signal for each of the plurality of periods of the carrier signal comprises determining at least one of a peak data sample value and a nadir data sample value for each of the plurality of periods of the carrier signal.

In some versions of these embodiments, determining at least one of a peak data sample value and a nadir data sample value for each of the plurality of periods of the carrier signal comprises determining the peak data sample by: (1) determining a maximum data sample value among samples within a window comprising a percentage of the data samples for one of the periods of the carrier signal; (2)

moving the window within the period and repeating step (1) so long as all data sample values are above a DC value of the AM signal; and (3) determining the peak data sample value for the period as the greatest of the maximum data sample values from steps (1) and (2).

In some versions of these embodiments, determining at least one of a peak data sample value and a nadir data sample value for each of the plurality of periods of the carrier signal comprises determining the nadir data sample by: (1) determining a minimum data sample value among data samples within a window comprising a percentage of the data samples for one of the periods of the carrier signal; (2) moving the window within the period and repeating step (1) so long as all data sample values are less than a DC value of the AM signal; and (3) determining the nadir data sample value for the period as the least of the minimum data sample values from steps (1) and (2).

In some versions of these embodiments, determining at least one of a peak data sample value and a nadir data sample value for each of the plurality of periods of the carrier signal comprises determining both the peak data sample and the nadir data sample by: (1) determining a maximum data sample value and a minimum data sample value among samples within a window comprising a percentage of the data samples for one of the periods of the carrier signal; (2) moving the window within the period and repeating step (1); (3) determining the peak data sample value for the period as the greatest of the maximum data sample values from steps (1) and (2); and (4) determining the nadir data sample value for the period as the least of the minimum data sample values from steps (1) and (2).

In some versions of these embodiments, determining an amplitude of the baseband signal for each of the plurality of periods of the carrier signal comprises: determining a peak data sample value and a nadir data sample value for each of the plurality of periods of the carrier signal; determining a peak-to-peak amplitude of the carrier in each period as a difference between the peak data sample value and the nadir data sample value; and determining the amplitude of the baseband signal in each period as ½ of the peak-to-peak amplitude of the carrier.

In some versions of these embodiments, determining an amplitude of the baseband signal for each of the plurality of periods of the carrier signal comprises: measuring the carrier frequency; determining a peak data sample value for a first one of the periods of the carrier frequency; and sampling the AM signal at a plurality of times each corresponding to an integer number of periods after a time of the peak data sample value for the first one of the periods.

In some versions of these embodiments, determining an amplitude of the baseband signal for each of a plurality of periods of the carrier signal comprises determining a root mean square (RMS) value of the data samples in each of the plurality of periods of the carrier signal, and determining the amplitude of the baseband signal based on the RMS value.

In some versions of these embodiments, determining an amplitude of the baseband signal for each of a plurality of periods of the carrier signal comprises, for at least some of the periods when the amplitude of the baseband signal is less than a threshold value: sampling the AM signal one carrier period away from another time when the AM signal is sampled, to produce an extrapolated data sample, and employing the extrapolated data samples to determine the amplitude of the baseband signal for the periods when the amplitude of the baseband signal is less than the threshold value.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1B:
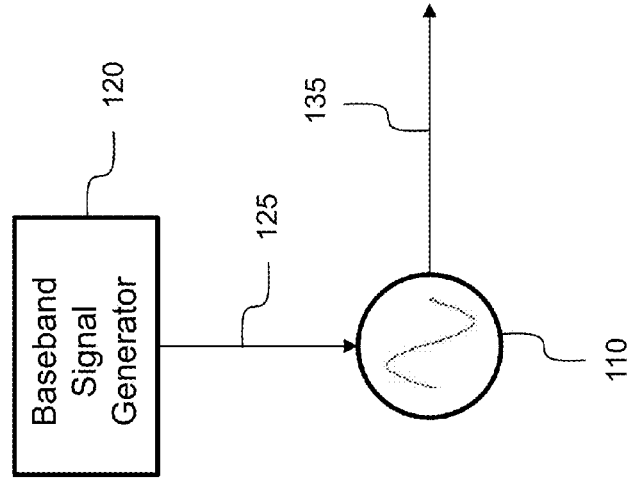
FIGS. 1A and 1B illustrate example embodiments of amplitude modulators.
Figure 1A:
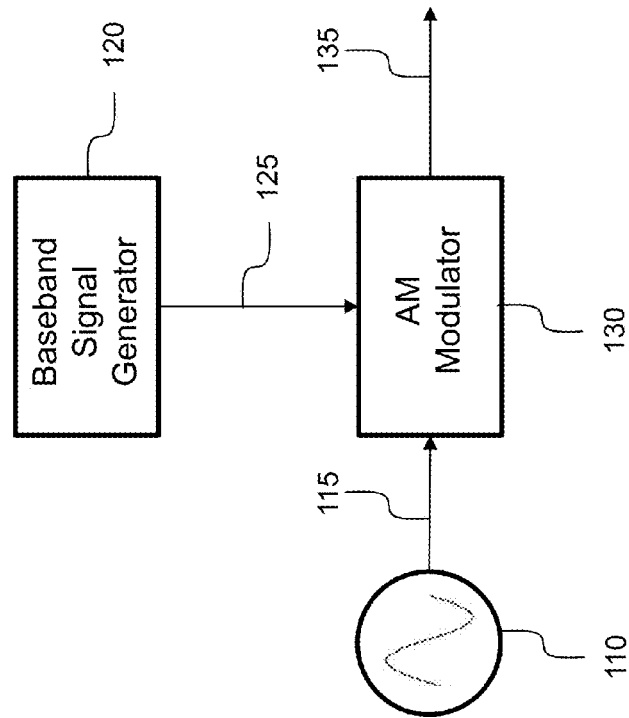
Figure 2:
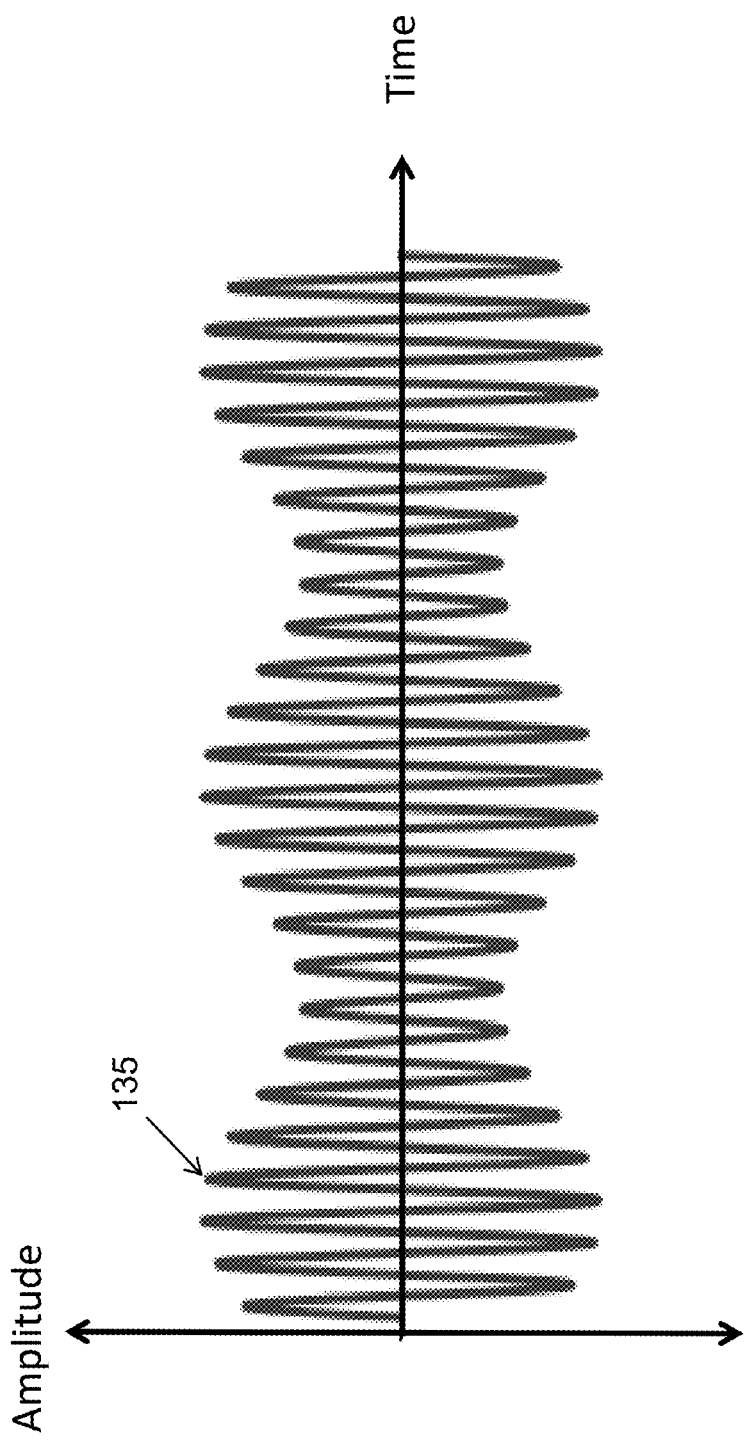
FIG. 2 illustrates an example embodiment of an amplitude modulation (AM) signal.
Figure 3:
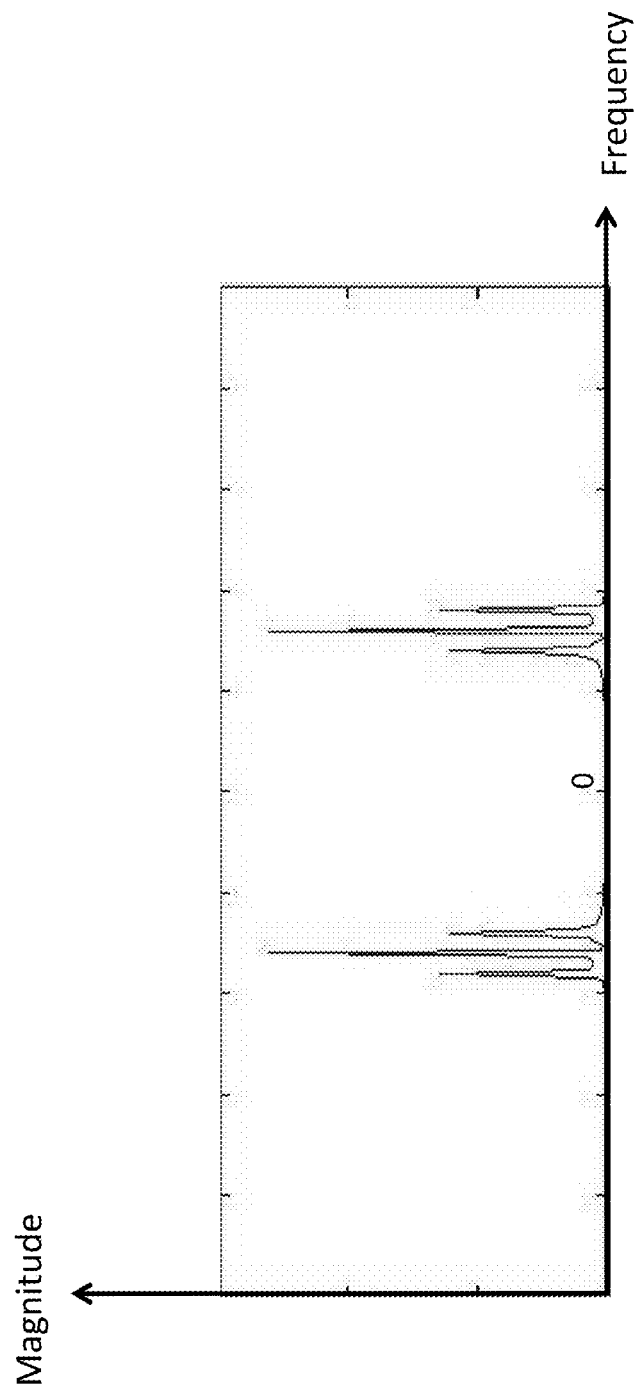
FIG. 3 illustrates an example embodiment the frequency spectrum of an AM signal.
Figure 4:
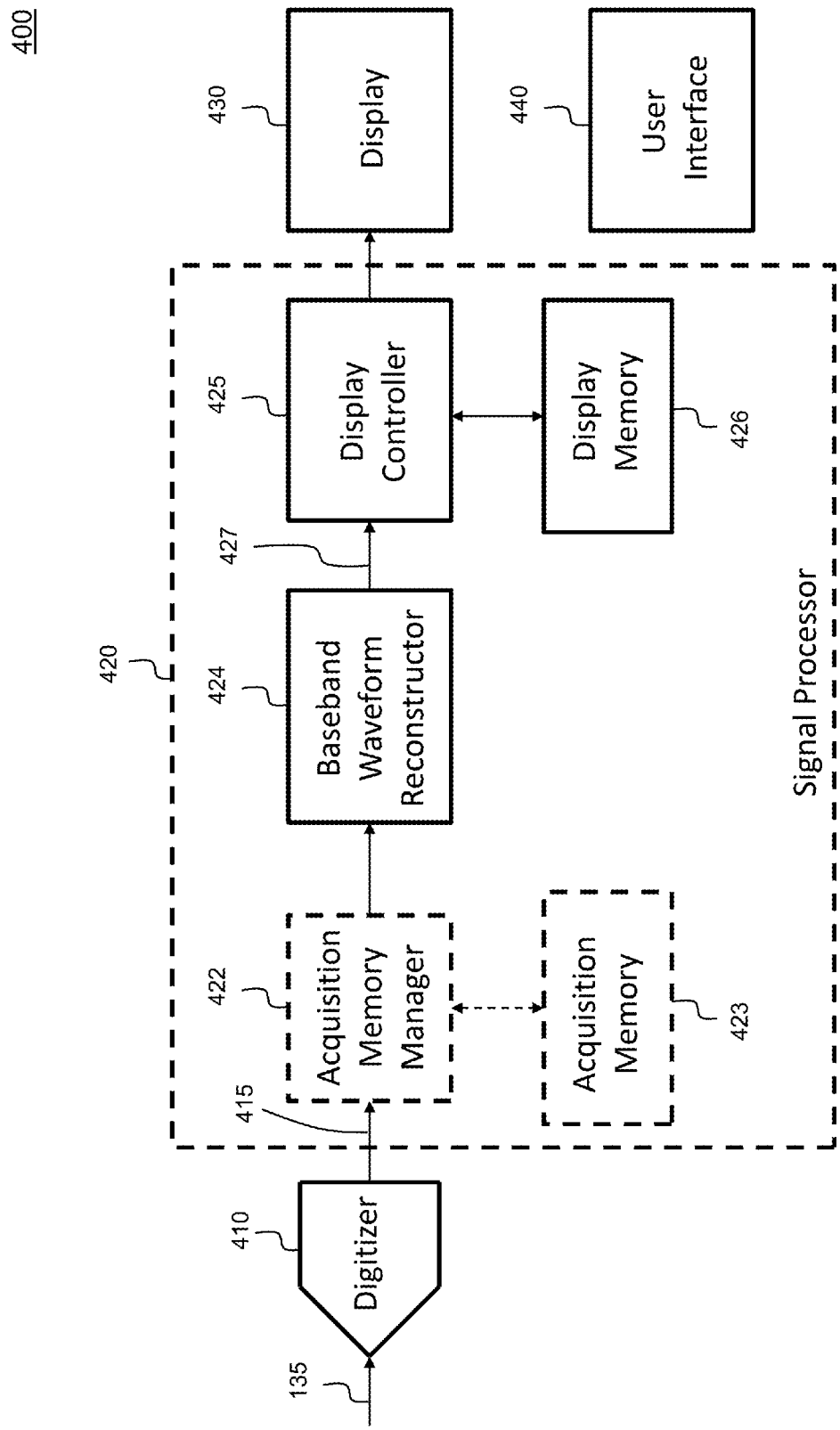
FIG. 4 is a block diagram of portions of an example embodiment of a measurement instrument.

FIG. 4 is a block diagram of portions of an example embodiment of a measurement instrument 400. Measurement instrument 400 may be a digital oscilloscope.

Measurement instrument 400 includes a digitizer 410, a signal processor 420, a display device 430, and a user interface 440. Signal processor 420 includes an acquisition memory manager 422, a first memory (also referred to herein as an acquisition memory) 423, a baseband waveform reconstructor 424, a display controller 425, and a second memory (also referred to herein as a display memory) 426.

In some embodiments, acquisition memory manager 422 and acquisition memory 423 may be omitted in which case baseband waveform reconstructor 424 operates directly on the output of digitizer 410.

In some embodiments, digitizer 410 comprises a sampling analog-to-digital converter.

In some embodiments, baseband waveform reconstructor 424 may comprise a microprocessor and memory. The memory may include volatile memory and/or non-volatile memory, and may store instructions to be executed by the microprocessor to perform one or more methods described below.

In some embodiments, baseband waveform reconstructor 424 may comprise one or more integrated circuits, which may include one or more application specific integrated circuits (ASICs) which are configured to perform one or more methods described below.

User interface 440 may include one or more user input devices for allowing user of measurement instrument 400 to control or program operations to be performed by measurement instrument 400, select one or more parameters of display 430, etc. Such input devices may include any combination or a touchscreen (which may be integrated with display 430), a keypad, a keyboard, a rollerball, a mouse, navigation buttons, etc. In some embodiments user interface 440 may include a communications port, such as an Ethernet port, for allowing measurement instrument 400 to be communicatively connected with one or more other devices, such as an external computer, by which a user may control or program operations to be performed by measurement instrument 400, select one or more parameters of display 430, etc. In response to data or instructions received from a user, user interface 440 may provide one or more signals to other elements of measurement instrument 400 (e.g., signal processor 420) which may control or program their operation.

Example operations of measurement instrument 400 will now be described.

Digitizer 410 receives AM signal 135.

Figure 5:
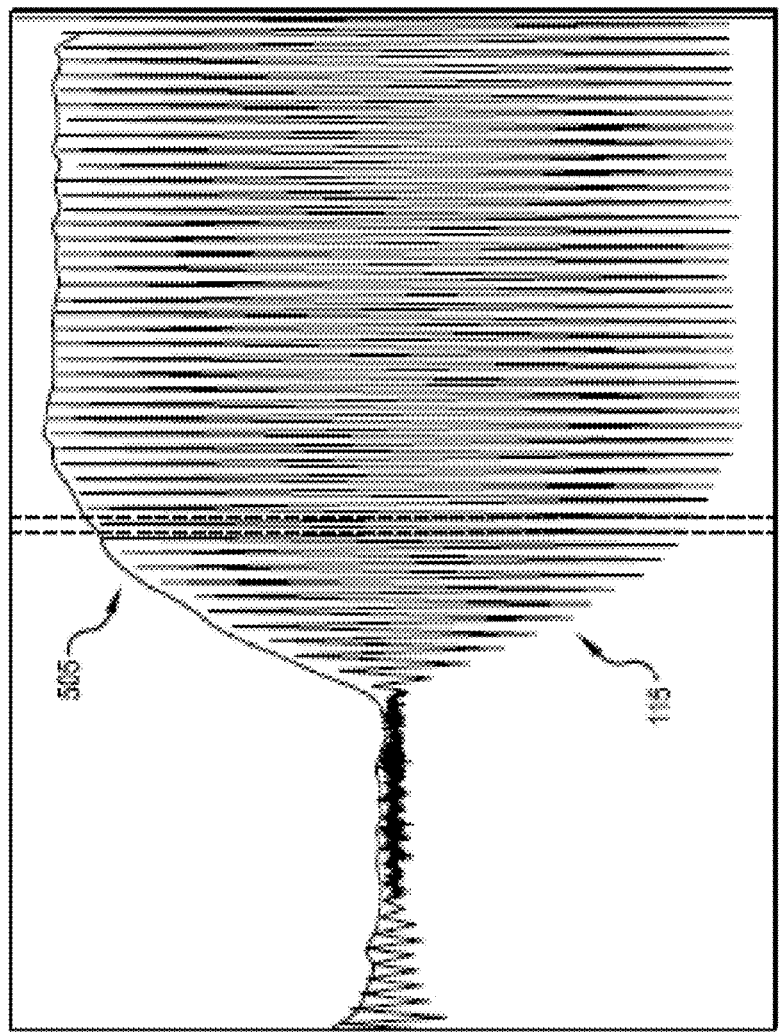
FIG. 5 illustrates a time domain plot of a sampled AM signal including a baseband waveform which may be processed by an example embodiment of a measurement instrument.
Figure 6:
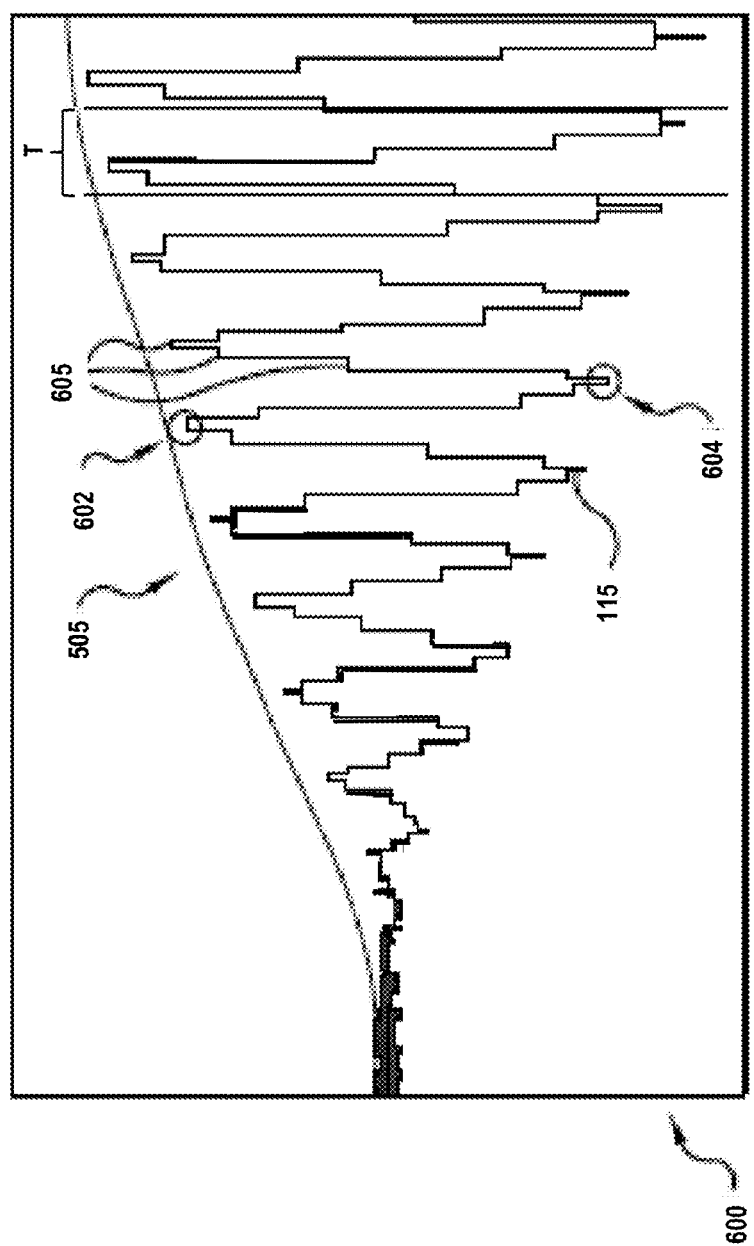
FIG. 6 illustrates another time domain plot of the sampled AM signal of FIG. 5, with higher time resolution.

FIG. 5 illustrates a time domain plot 500 of a sampled AM signal which may be processed by an example embodiment of measurement instrument 400, such as a digital oscilloscope. FIG. 6 illustrates another time domain plot 600 of the sampled AM signal of FIG. 5, with higher time resolution.

As seen in FIGS. 5 and 6, the sampled AM signal comprises a baseband signal (e.g., baseband signal 125), having a baseband waveform 505, modulating a carrier signal 115.

Digitizer 410 samples AM signal 135 at a sampling rate which produces a plurality of data samples 415 for each period T (see FIG. 6) of carrier signal 115. For example, in some embodiments digitizer 410 may produce 10, 20 or more data samples 415 of AM signal 135 for each period T of carrier signal 115. FIG. 6 illustrates the display of a number of amplitude steps 605 for the sampled AM signal, each corresponding to a value of one of the data sampled 415.

In embodiments which include acquisition memory manager 422 and acquisition memory 423, acquisition memory manager 422 stores data samples 415 in acquisition memory 423.

Under control of acquisition memory manager 422, data samples from acquisition memory 423 are provided to baseband waveform reconstructor 424, which processes the data samples as described in greater detail below to reconstruct baseband waveform 505 and produces data 427 which represents reconstructed baseband waveform 505.

In general, data 427, which represents reconstructed baseband waveform 505, may be employed in a variety of ways, in a variety of contexts, for a variety of purposes. As but a few examples, data 427 may be used to make one or more measurements of baseband waveform 505 or baseband signal 125, as an input to a mathematical processor, or even to drive a loudspeaker, for example in a case where baseband signal 125 is an audio signal. The present disclosure is not limited to any particular use of data 427. However, to provide a concrete example of a system and process which may employ data 427, in the description to follow data 427 will be employed by measurement instrument 400 to produce a display of the reconstructed baseband waveform 505.

In that case, under control of display controller 425, data 427 is stored in display memory 426 as display data, and at an appropriate time is retrieved from display memory 426 for display by display device 430.

The inventors have appreciated that if the carrier frequency is sufficiently greater than the highest sampling frequency needed to recover baseband signal 125, then the amplitude of AM signal 135 in each period T of carrier signal 115 can be considered to be a valid time domain sample of baseband signal 125. By connecting these time domain samples, baseband waveform 505 may be reconstructed. This can be seen through careful inspection of FIGS. 5 and 6. In some embodiments, the amplitude of AM signal 135 in each period T of carrier signal 115 may be determined from the peak value 602 of data samples 415 within the period. In other embodiments, the amplitude of AM signal 135 in each period T of carrier signal 115 may be determined from the nadir value 604 of data samples 410 within the period. In still other embodiments, the amplitude of AM signal 135 in each period T of carrier signal 115 may be determined from a difference between peak value 602 and nadir value 604 within the period. In yet other embodiments, the amplitude of AM signal 135 in each period T of carrier signal 115 may be determined from the root-mean-square of the values of all of the data samples within the period.

It is convenient if carrier signal 115 has a unique peak value 602 and/or nadir value 604 in each period T, such as is the case with a sine wave or triangle wave. However even when carrier signal 115 is a square wave signal, valid time domain samples of baseband signal 125 may be obtained if a consistent phase for the sample is used from period to period of carrier signal 115.

Figure 7:
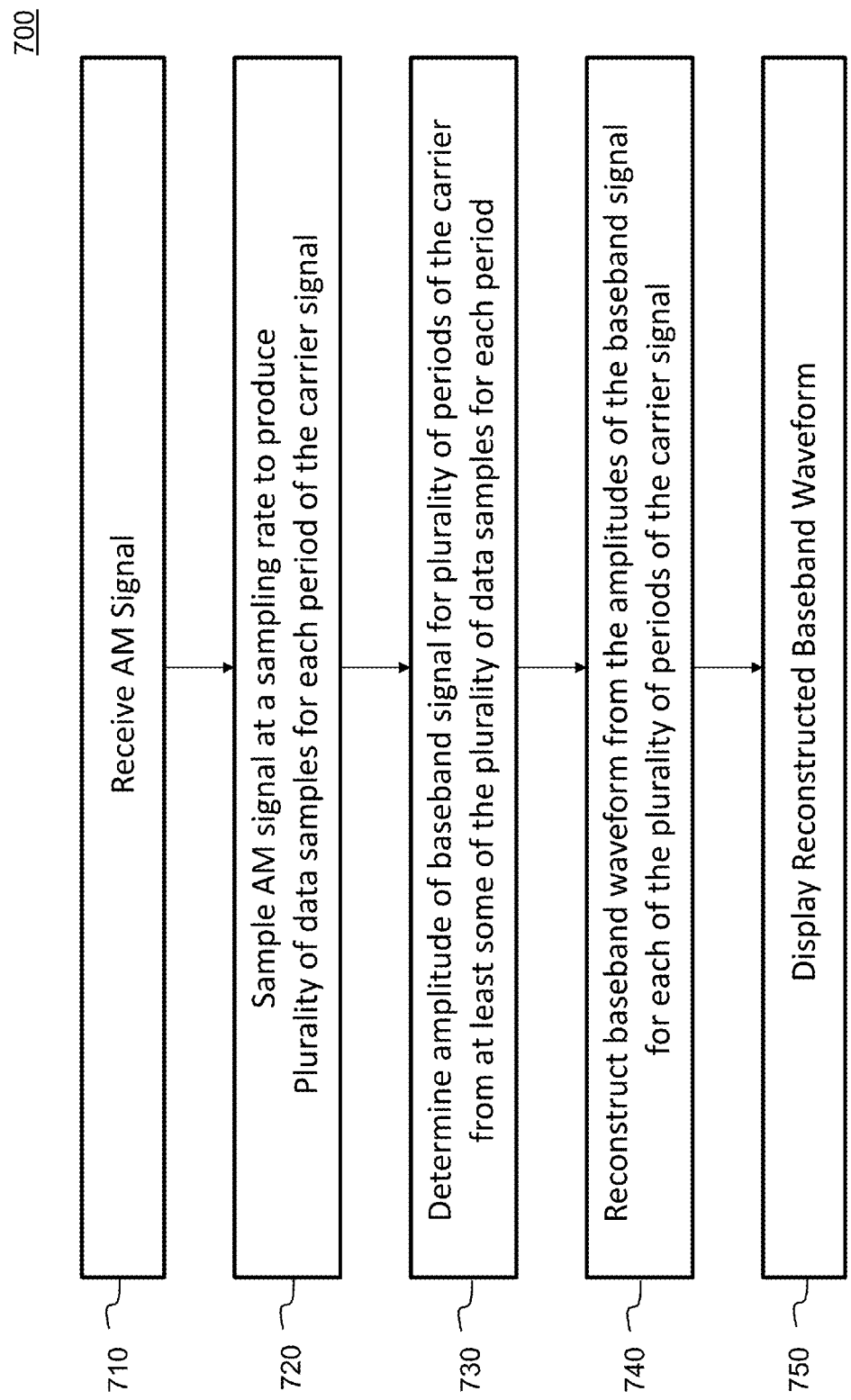
FIG. 7 is a flowchart of an example embodiment of a method of processing an AM signal to display the baseband waveform of a baseband signal which produced the AM signal.

FIG. 7 is a flowchart of an example embodiment of a method 700 of processing an AM signal to display the baseband waveform of a baseband signal which produced the AM signal. In some embodiments, method 700 may be performed by measurement instrument 400, and the method will hereafter de described with respect to execution by measurement instrument 400, which as noted above may comprise a digital oscilloscope.

In an operation 710, measurement instrument 400 receives AM signal 135 comprising a baseband signal 125, having a baseband waveform 505, modulating a carrier signal 115.

In an operation 720, digitizer 410 samples AM signal 135 at a sampling rate which produces a plurality of data samples 415 for each period T of carrier signal 115.

In an operation 730, baseband waveform reconstructor 424 determines an amplitude of baseband signal 125 for each of a plurality of periods T of carrier signal 115 from at least some of the plurality of data samples 415 for each period. Various embodiments of this operation 730 will be described in greater detail below with respect to FIGS. 8-12.

In an operation 740, baseband waveform reconstructor 424 reconstructs baseband waveform 505 from the amplitudes of baseband signal 125 for each of the plurality of periods T of carrier signal. In some embodiments, this may comprise "stitching" together the data samples which represent the amplitudes of baseband signal 125 for each of the plurality of periods T of carrier signal. In some embodiments, this may comprise passing the data samples which represent the amplitudes of baseband signal 125 for each of the plurality of periods T of carrier signal through a low-pass filter.

In an operation 750, display device 430 displays the reconstructed baseband waveform 505.

In method 700, it is seen that baseband waveform 505 may be extracted from AM signal 135 by determining an amplitude of baseband signal 135 for each of a plurality of periods T of carrier signal 115 from at least some of the plurality of data samples 415 for each period. FIGS. 8-12 illustrate various example methods of determining an amplitude of a baseband signal 135 for each of a plurality of periods T of carrier signal 115 from at least some of the plurality of data samples for each period.

Figure 8:
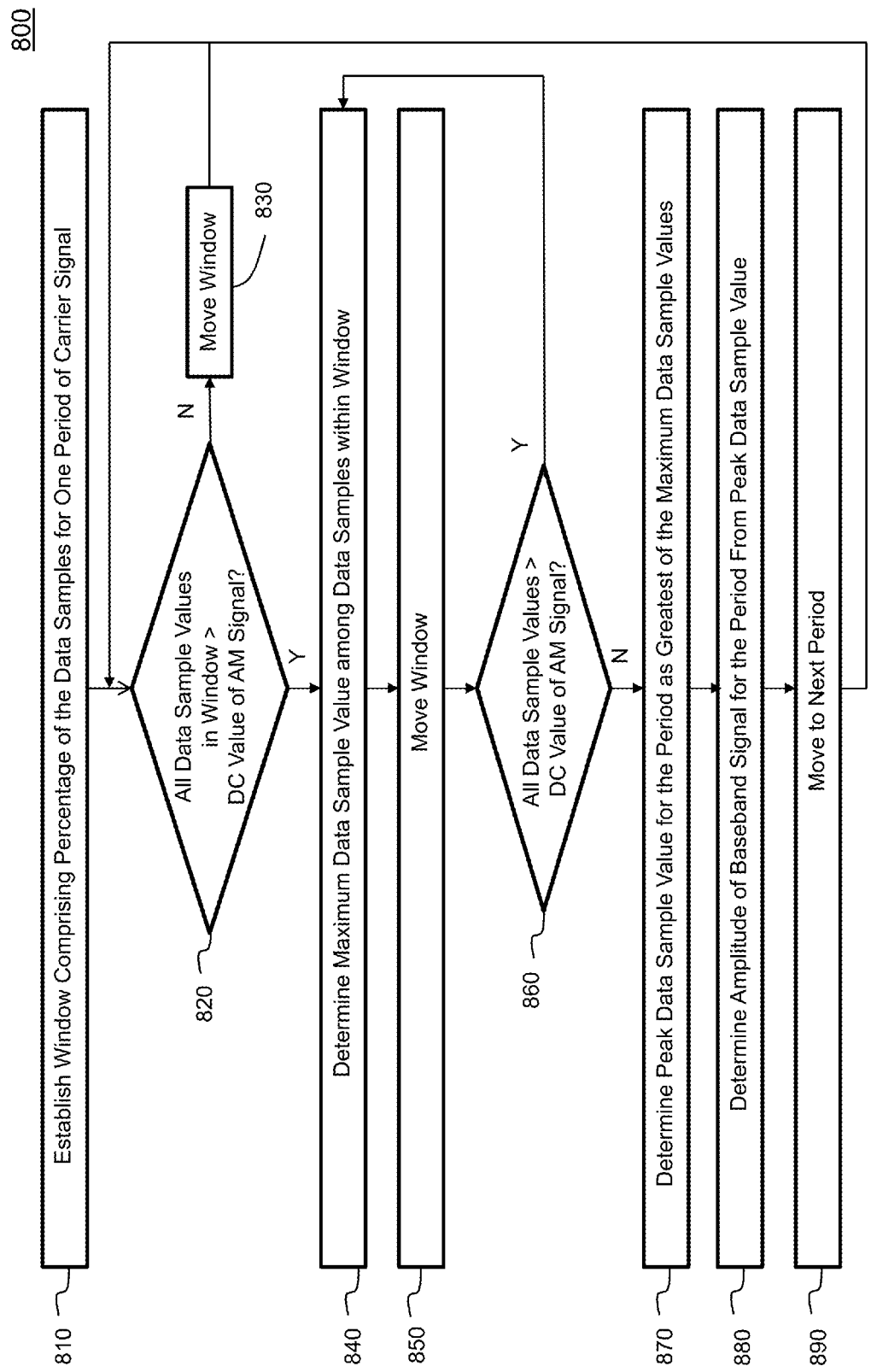
FIG. 8 is a flowchart of a first example embodiment of a method of determining the amplitude of a baseband signal a plurality of periods of a carrier signal.

FIG. 8 is a flowchart of a first example embodiment of a method 800 of determining the amplitude of baseband signal 125 for a plurality of periods T of carrier signal 115. In particular, method 800 is an embodiment of a method which determines the amplitude of baseband signal 125 for a plurality of periods of a carrier signal by finding the peak data sample value of AM signal 135 within each period T of carrier signal 115.

In an operation 810, baseband waveform reconstructor 424 establishes a sliding window of data samples 415 within one period of carrier signal 115. The window comprises a percentage of the data samples 415 for one period of carrier signal 115, for example 10% to 40% of data samples 415 within one period of carrier signal 115.

In an operation 820, baseband waveform reconstructor 424 determines whether or not all data samples 415 within the window are greater than the DC value of the sampled AC signal. If not, then the process proceeds to an operation 830 where the window is moved. In cases where the sampled AC signal has no DC offset, then baseband waveform reconstructor 424 determines whether or not all data samples 415 within the window are greater than zero. This operation is performed because we do not want baseband waveform reconstructor 424 to erroneously determine a peak data sample value using the data samples in the negative half of the period T.

In some embodiments, the window may be moved in operation 830 by one data sample 415. In other embodiments, the window may be moved by more than one data sample 415. In still other embodiments, the window may be moved by the entire number of data samples 415 within one window such that there is no overlap from one window position to the next. After operation 830, the process returns to operation 820.

If it is determined in operation 820 that all data samples 415 within the window are greater than the DC value of the sampled AC signal, then the process proceeds to operation 840.

In operation 840, baseband waveform reconstructor 424 determines the maximum data sample value within the window. Baseband waveform reconstructor 424 may temporarily store this maximum data sample value in memory for subsequent comparison to other maximum data sample values within other windows in the period of carrier signal 115.

In an operation 850, baseband waveform reconstructor 424 moves the window. In other embodiments, the window may be moved by more than one data sample 415. In still other embodiments, the window may be moved by the entire number of data samples 415 within one window such that there is no overlap from one window position to the next.

In an operation 860, baseband waveform reconstructor 424 determines whether or not all data samples 415 within the window are greater than the DC value of the sampled AC signal. If so, then the process returns to operation 840.

If in operation 860 baseband waveform reconstructor 424 determines that all data samples 415 within the window are not greater than the DC value of the sampled AC signal, then in an operation 870 baseband waveform reconstructor 424 determines the peak data sample value for the period as the greatest of the maximum data sample values for all the windows within the period. In some embodiments, all of the maximum data sample values for all the windows within the period may be saved in memory and compared to each other during operation 870. In other embodiments, the maximum data sample value of each window may be compared after operation 840 with a current greatest maximum data sample value stored in memory from previous windows, and whichever is greater is stored in memory as the current greatest maximum data sample value. Other techniques for determining the greatest of the maximum data sample values for all the windows within the period may be employed.

In an operation 880, baseband waveform reconstructor 424 determines the amplitude of baseband signal 125 for the period from the peak data sample value, for example by assigning the peak data sample value as the amplitude of baseband signal 125 for the period. The amplitude of baseband signal 125 for the period may then be stored in a memory, for example second memory (display memory) 426.

In an operation 890, baseband waveform reconstructor 424 moves to the next period and repeats the process for the next period beginning at operation 820.

In method 800, it is assumed that baseband waveform reconstructor 424 has access to at least some reasonably accurate knowledge of the carrier frequency so that it can reasonably accurately estimate one period of carrier signal 115 for operation 890. However, slight errors in the carrier frequency will not affect the process. Also, if the carrier period is not an integer multiple of the data sample rate, then there exists a phase error which accumulates from period to period. Method 800 can realign the window to the samples in order to prevent the phase error from compounding.

Figure 9:
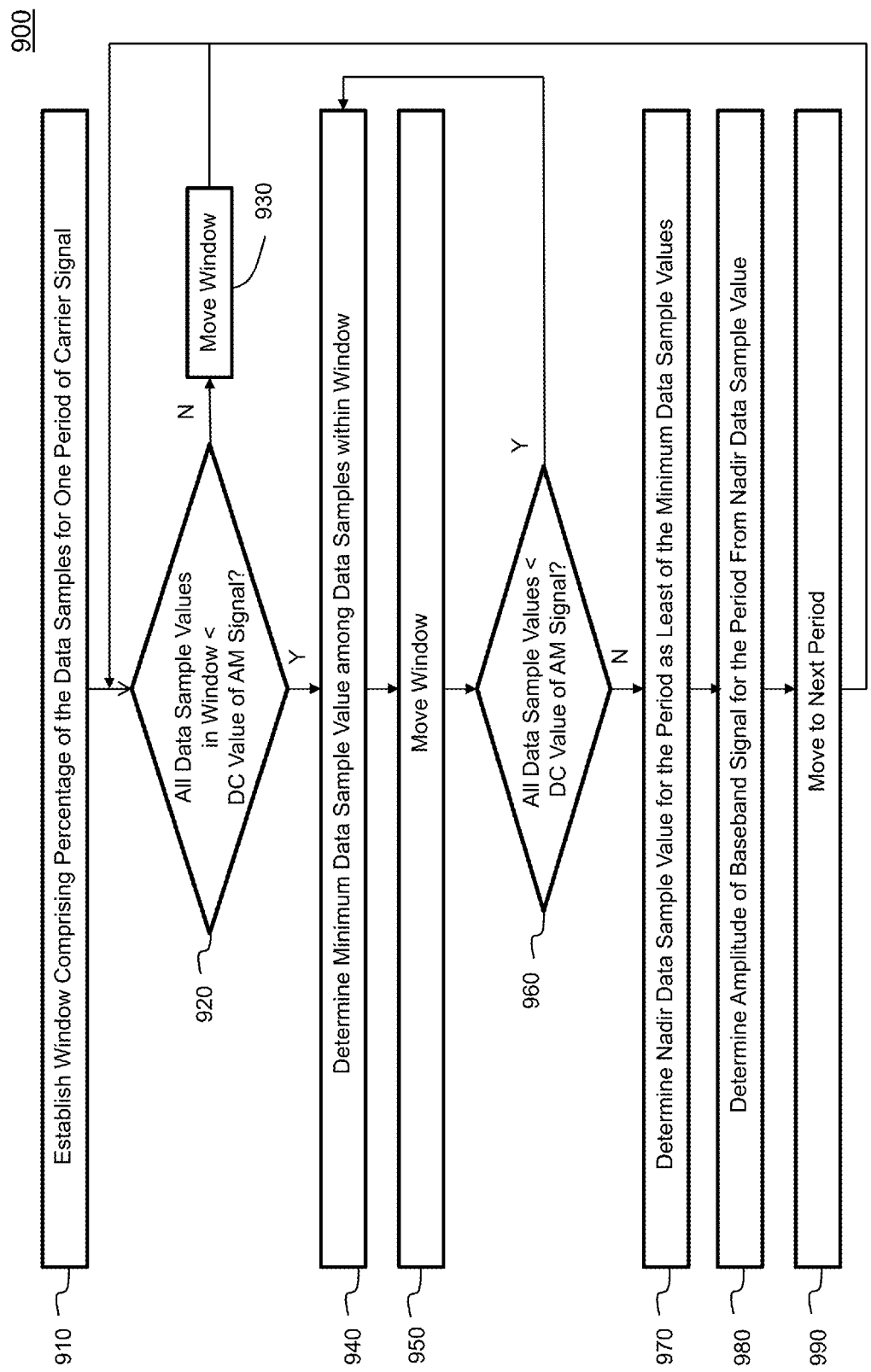
FIG. 9 is a flowchart of a second example embodiment of a method of determining the amplitude of a baseband signal a plurality of periods of a carrier signal.

FIG. 9 is a flowchart of a second example embodiment of a method 900 of determining the amplitude of a baseband signal for a plurality of periods of a carrier signal. In particular, method 900 is an embodiment of a method which determines the amplitude of baseband signal 125 for a plurality of periods of a carrier signal by finding the nadir data sample value of AM signal 135 within each period T of carrier signal 115.

In an operation 910, baseband waveform reconstructor 424 establishes a sliding window of data samples 415 within one period of carrier signal 115. The window comprises a percentage of the data samples 415 for one period of carrier signal 115, for example 10% to 40% of data samples 415 within one period of carrier signal 115.

In an operation 920, baseband waveform reconstructor 424 determines whether or not all data samples 415 within the window are less than the DC value of the sampled AC signal. If not, then the process proceeds to an operation 930 where the window is moved. In cases where the sampled AC signal has no DC offset, then baseband waveform reconstructor 424 determines whether or not all data samples 415 within the window are less than zero. This operation is performed because we do not want baseband waveform reconstructor 424 to erroneously determine a nadir data sample value using the data samples in the positive half of the period T.

In some embodiments, the window may be moved in operation 930 by one data sample 415. In other embodiments, the window may be moved by more than one data sample 415. In still other embodiments, the window may be moved by the entire number of data samples 415 within one window such that there is no overlap from one window position to the next. After operation 930, the process returns to operation 920.

If it is determined in operation 920 that all data samples 415 within the window are less than the DC value of the sampled AC signal, then the process proceeds to operation 940.

In operation 940, baseband waveform reconstructor 424 determines the minimum data sample value within the window. Baseband waveform reconstructor 424 may temporarily store this minimum data sample value in memory for subsequent comparison to other minimum data sample values within other windows in the period of carrier signal 115.

In an operation 950, baseband waveform reconstructor 424 moves the window. In other embodiments, the window may be moved by more than one data sample 415. In still other embodiments, the window may be moved by the entire number of data samples 415 within one window such that there is no overlap from one window position to the next.

In an operation 960, baseband waveform reconstructor 424 determines whether or not all data samples 415 within the window are less than the DC value of the sampled AC signal. If so, then the process returns to operation 940.

If in operation 960 baseband waveform reconstructor 424 determines that all data samples 415 within the window are not less than the DC value of the sampled AC signal, then in an operation 970 baseband waveform reconstructor 424 determines the nadir data sample value for the period as the least of the minimum data sample values for all the windows within the period. In some embodiments, all of the minimum data sample values for all the windows within the period may be saved in memory and compared to each other after operation 970. In other embodiments, the minimum data sample value of each window may be compared after operation 940 with a current least minimum data sample value stored in memory from previous windows, and whichever is less is stored in memory as the current least minimum data sample value. Other techniques for determining the least of the minimum data sample values for all the windows within the period may be employed.

In an operation 980, baseband waveform reconstructor 424 determines the amplitude of baseband signal 125 for the period from the nadir data sample value, for example by assigning the nadir data sample value as the amplitude of baseband signal 125 for the period, or by offsetting it with the DC value where appropriate. The amplitude of baseband signal 125 for the period may then be stored in a memory, for example second memory (display memory) 426.

In an operation 990, baseband waveform reconstructor 424 moves to the next period and repeats the process for the next period beginning at operation 920.

In method 900, it is assumed that baseband waveform reconstructor 424 has access to at least some reasonably accurate knowledge of the carrier frequency so that it can reasonably accurately estimate one period of carrier signal 115 for operation 990. However, slight errors in the carrier frequency will not affect the process. Also, if the carrier period is not an integer multiple of the data sample rate, then there exists a phase error which accumulates from period to period. Method 900 can realign the window to the samples in order to prevent the phase error from compounding.

The inventors have further appreciated that the operations of methods 800 and 900 may be streamlined and made to operate faster if the frequency of carrier signal 115 is more accurately determined by measurement instrument 400.

Figure 10:
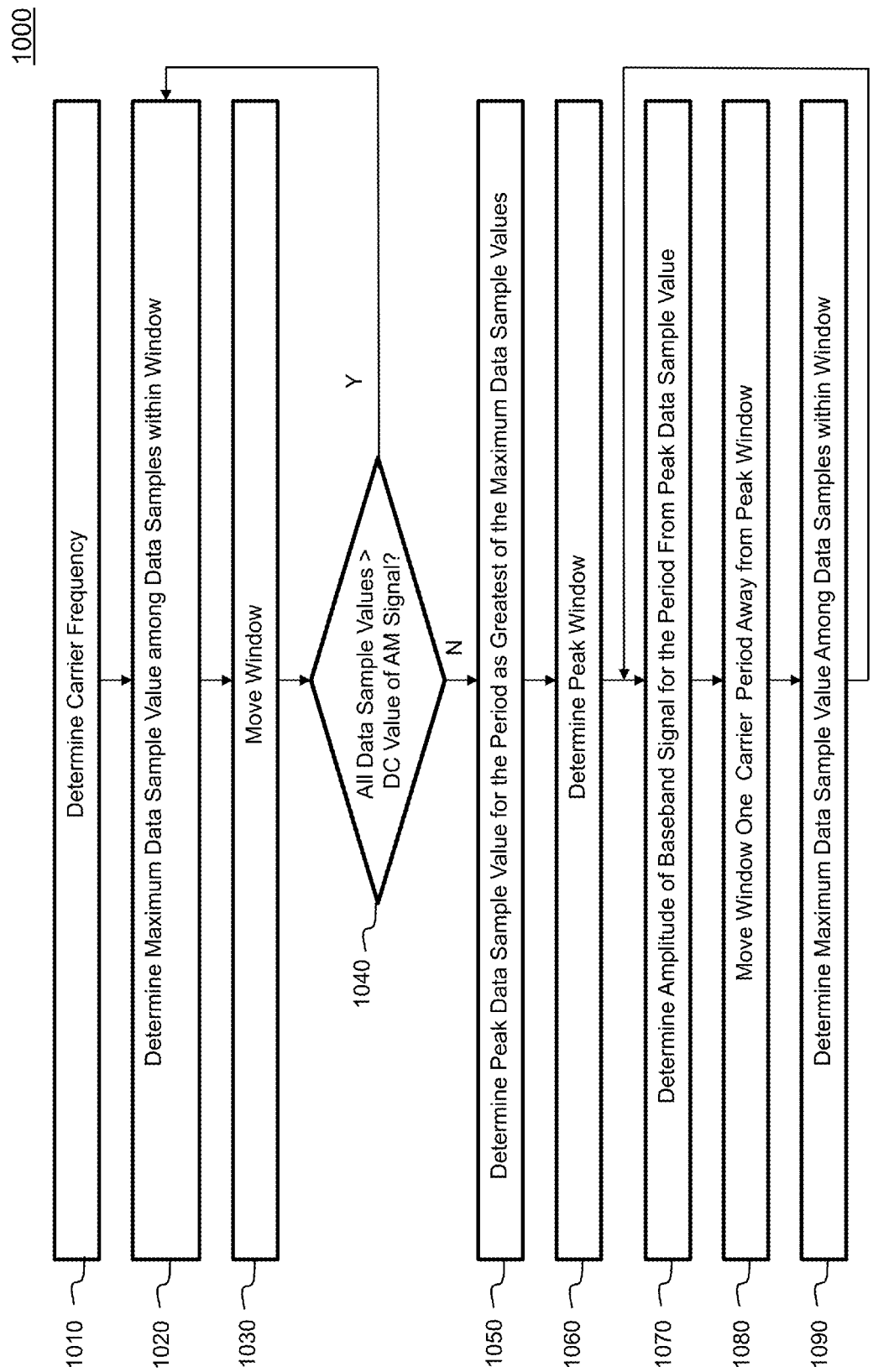
FIG. 10 is a flowchart of a third example embodiment of a method of determining the amplitude of a baseband signal a plurality of periods of a carrier signal.

FIG. 10 is a flowchart of a third example embodiment of a method 1000 of determining the amplitude of a baseband signal for a plurality of periods of a carrier signal. Like method 800, method 1000 is an embodiment of a method which determines the amplitude of baseband signal 125 for a plurality of periods of a carrier signal by finding the peak data sample value of AM signal 135 within each period T of carrier signal 115.

It should be understood that method 1000 may include some initialization operations similar to operations 810, 820 and 830 in FIG. 8, but which are omitted in FIG. 10 t simply the illustration.

In an operation 1010, measurement instrument 400 determines the carrier frequency of the received AM signal 135. In some embodiments, the carrier frequency may be retrieved, for example in response to a user selection via user interface 440 of an operation to be performed by measurement instrument 400, from a memory device in measurement instrument 400 where it was prestored during manufacture of measurement instrument 400. In some embodiments, a user may provide the carrier frequency direction to measurement instrument 400 via user interface 440. In still other embodiments, where a priori knowledge of the carrier frequency is not available, measurement instrument 400 may measure the carrier frequency using techniques known in the art.

In an operation 1020, baseband waveform reconstructor 424 determines the maximum data sample value within the window. Baseband waveform reconstructor 424 may temporarily store this maximum data sample value in memory for subsequent comparison to other maximum data sample values within other windows in the period of carrier signal 115.

In an operation 1030, baseband waveform reconstructor 424 moves the window. In other embodiments, the window may be moved by more than one data sample 415. In still other embodiments, the window may be moved by the entire number of data samples 415 within one window such that there is no overlap from one window position to the next.

In an operation 1040, baseband waveform reconstructor 424 determines whether or not all data samples 415 within the window are greater than the DC value of AC signal 135. If so, then the process returns to operation 1020.

If in operation 1040 baseband waveform reconstructor 424 determines that all data samples 415 within the window are not greater than the DC value of AC signal 135, then in an operation 1050 baseband waveform reconstructor 424 determines the peak data sample value for the period as the greatest of the maximum data sample values for all the windows within the period. In some embodiments, all of the maximum data sample values for all the windows within the period may be saved in memory and compared to each other during operation 1070. In other embodiments, the maximum data sample value of each window may be compared after operation 1020 with a current greatest maximum data sample value stored in memory from previous windows, and whichever is greater is stored in memory as the current greatest maximum data sample value. Other techniques for determining the greatest of the maximum data sample values for all the windows within the period may be employed.

In an operation 1060, baseband waveform reconstructor 424 determines the "peak window" which produced the peak data sample. The timing of the peak window will be used in subsequent operations, as explained below.

In an operation 1070, baseband waveform reconstructor 424 determines the amplitude of baseband signal 125 for the period from the peak data sample value, for example by assigning the peak data sample value as the amplitude of baseband signal 125 for the period. The amplitude of baseband signal 125 for the period may then be stored in a memory, for example second memory (display memory) 426.

In an operation 1080, baseband waveform reconstructor 424 moves the window one carrier period away from the peak window which was determined in operation 1060. Here, baseband waveform reconstructor 424 takes advantage of its accurate knowledge of the carrier frequency from operation 1010, as once it has found the peak data sample value for one period, the timing of the peak data sample value for the next period must be exactly one period later. Thus only one window needs to be checked for all subsequent carrier periods after the first one, thereby increasing the speed and efficiency of the method. In the event that the carrier period is not an integer multiple of the data sample rate, then there exists a phase error which accumulates from period to period. In that case, operation 1080 may include an optional step of realigning the window in order to account for the phase offset.

It should be understood that method 900, which employs the nadirs, may be streamlined in a similar manner as illustrated above with respect to operation 1000.

Figure 11:
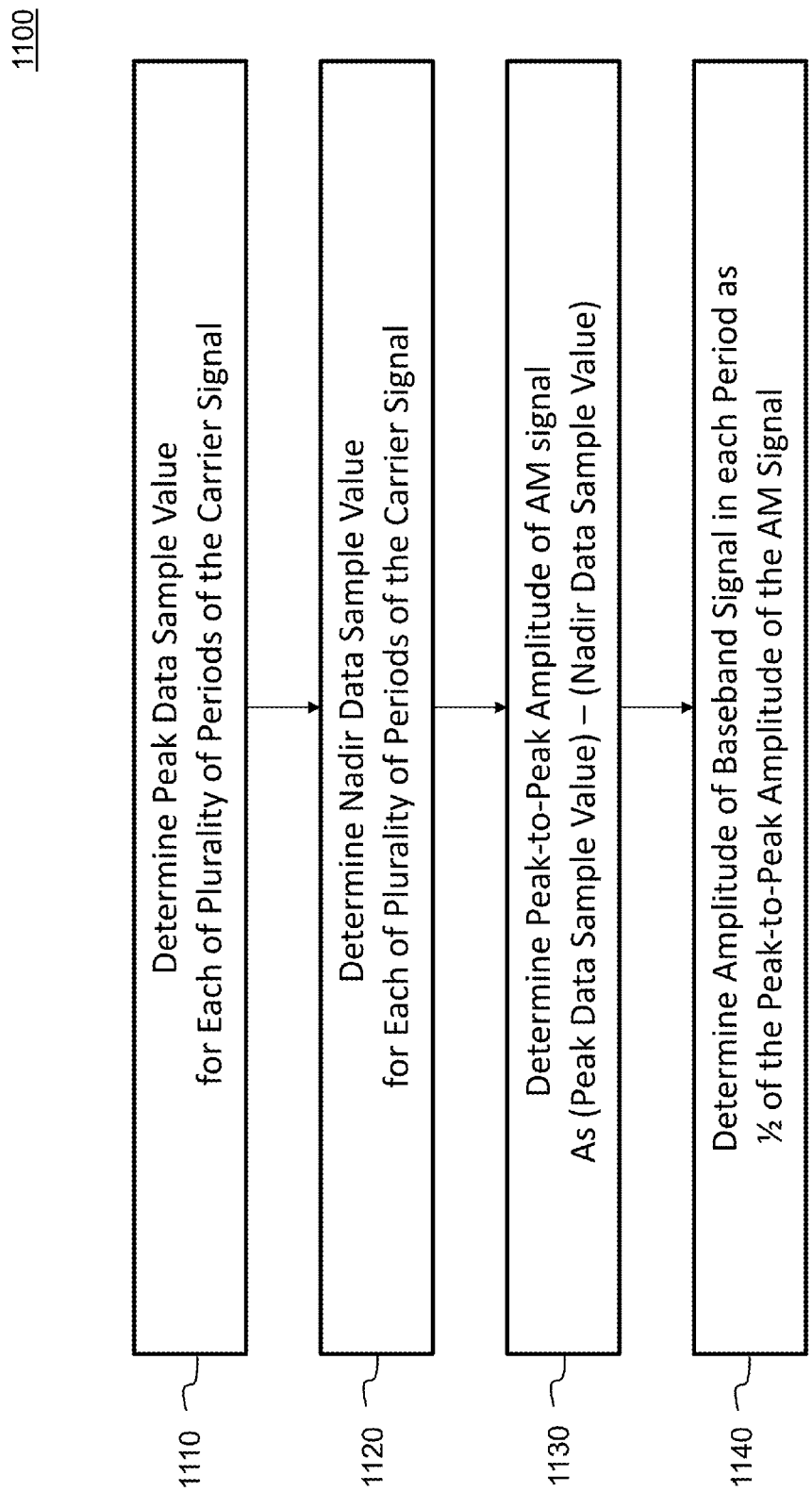
FIG. 11 is a flowchart of a fourth example embodiment of a method of determining the amplitude of a baseband signal a plurality of periods of a carrier signal.

FIG. 11 is a flowchart of a fourth example embodiment of a method 1100 of determining the amplitude of a baseband signal for a plurality of periods of a carrier signal.

In an operation 1110, baseband waveform reconstructor 424 determines the peak data sample value for each of a plurality of periods of carrier signal 115. This may be done, in some embodiments, for example, through operations of methods 800 or 1000, as described above.

In an operation 1120, baseband waveform reconstructor 424 determines the nadir data sample value for each of a plurality of periods of carrier signal 115. This may be done, in some embodiments, for example, through operations of method 900, or a modified version of method 900 similar to method 1000, as described above.

In an operation 1130, baseband waveform reconstructor 424 determines the peak-to-peak amplitude of AM signal 135 for each period T of carrier signal 115 as the difference between the peak data sample value and the nadir data sample value.

In an operation 1140, baseband waveform reconstructor 424 determines the amplitude of baseband signal 125 for the period T as ½ of the peak-to-peak amplitude of the AM signal 135 for the period.

Here again, optionally a DC value of the sampled AC signal may be added in step 1140 when such a DC value exists.

Figure 12:
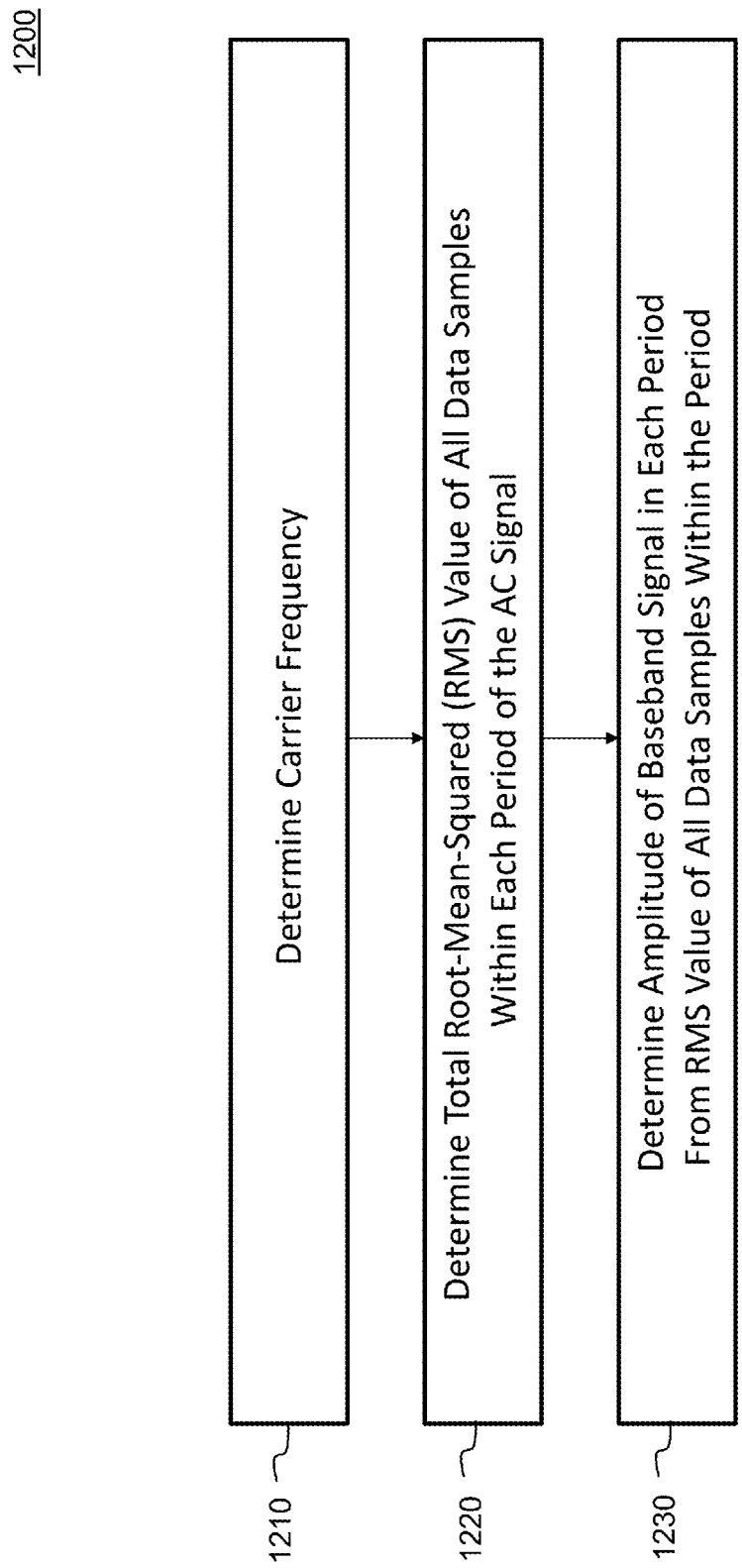
FIG. 12 is a flowchart of a fifth example embodiment of a method of determining the amplitude of a baseband signal a plurality of periods of a carrier signal.

FIG. 12 is a flowchart of a fifth example embodiment of a method 1200 of determining the amplitude of a baseband signal for a plurality of periods of a carrier signal. In particular, method 1200 is an embodiment of a method which determines the amplitude of baseband signal 125 for a plurality of periods of a carrier signal by finding the root-mean-squared (RMS) value of all of the data samples 414 of AM signal 135 within each period T of carrier signal 115.

In an operation 1210, baseband waveform reconstructor 424 determines the carrier frequency. This operation may be performed in the same manner as operation 1010 in method 1000, so a description thereof will not be repeated.

In an operation 1220, baseband waveform reconstructor 424 determines the root-mean-squared (RMS) value of all of the data samples 414 of AM signal 135 within each period T of carrier signal 115. Methods for the calculation of an RMS value for a collection of data sample values are known.

In an operation 1230, baseband waveform reconstructor 424 determines the amplitude of baseband signal 125 for each period T from the RMS value of the data samples 415 within that period. Beneficially, the relationship between RMS value and amplitude is a known relationship based on the waveform of carrier signal 115. For example, where carrier signal 115 is known by measurement instrument 400 to be a sine wave signal, then the amplitude in each period is known to be the RMS value for that period multiplied by the square root of two (approximately 1.414).

While example embodiments are disclosed herein, one of ordinary skill in the art appreciates that many variations that are in accordance with the present teachings are possible and remain within the scope of the appended claims. For example, in some embodiments the AM signal may exhibit 100%, or nearly 100%, modulation depth making the determination of the amplitude difficult or impossible for some periods of the carrier signal. In that case, in some embodiments baseband waveform reconstructor 424 can test for this condition, and when it is present, extrapolate from the last clear apex data sample value or nadir data sample value until the amplitude of the AM signal is again sufficiently large to be determined.

Additionally, the example methods described above produce amplitude samples of the baseband signal at 1× or 2× the carrier frequency, when in many cases may be a much higher data rate than is needed to faithfully reproduce the baseband waveform, and may impose unnecessary signal processing requirements on the consumer of the amplitude samples. Accordingly, in some embodiments a simple boxcar filter may be employed to reduce noise. That is, the data can be reduced by taking the average of adjacent samples in sub intervals of the output, which may also have the benefit of reducing noise.

The invention therefore is not to be restricted except within the scope of the appended claims.

The invention claimed is:

1. A method, comprising:
    receiving an amplitude modulated (AM) signal comprising a baseband signal, having a baseband waveform, modulating a carrier signal;
    sampling the AM signal at a sampling rate which produces a plurality of data samples for each period of the carrier signal;
    determining an amplitude of the baseband signal for each of a plurality of periods of the carrier signal from at least some of the plurality of data samples for each period; and
    reconstructing the baseband waveform from the amplitudes of the baseband signal for each of the plurality of periods of the carrier signal.

2. The method of claim 1, wherein determining an amplitude of the baseband signal for each of the plurality of periods of the carrier signal comprises determining at least one of a peak data sample value and a nadir data sample value for each of the plurality of periods of the carrier signal.

3. The method of claim 2, wherein the step of determining at least one of a peak data sample value and a nadir data sample value for each of the plurality of periods of the carrier signal comprises determining the peak data sample value by:
    (1) determining a maximum data sample value among the data samples within a window comprising a percentage of the data samples for one of the periods of the carrier signal;
    (2) moving the window within the period and repeating step (1) so long as all data sample values are greater than a DC value of the AM signal; and
    (3) determining the peak data sample value for the period as the greatest of the maximum data sample values from steps (1) and (2).

4. The method of claim 3, further comprising moving the window to the next period and repeating steps (1) through (3) for the next period.

5. The method of claim 2, wherein the step of determining at least one of a peak data sample value and a nadir data sample value for each of the plurality of periods of the carrier signal comprises determining the nadir data sample by:
    (1) determining a minimum data sample value among the data samples within a window comprising a percentage of the data samples for one of the periods of the carrier signal;
    (2) moving the window within the period and repeating step (1) so long as all data sample values are less than a DC value of the AM signal; and
    (3) determining the nadir data sample value for the period as the least of the minimum data sample values from steps (1) and (2).

6. The method of claim 5, further comprising moving the window to the next period and repeating steps (1) through (3) for the next period.

7. The method of claim 2, wherein the step of determining at least one of a peak data sample value and a nadir data sample value for each of the plurality of periods of the carrier signal comprises determining both the peak data sample and the nadir data sample by:
    (1) determining a maximum data sample value and a minimum data sample value among the data samples within a window comprising a percentage of the data samples for one of the periods of the carrier signal;
    (2) moving the window within the period and repeating step (1);
    (3) determining the peak data sample value for the period as the greatest of the maximum data sample values from steps (1) and (2); and
    (4) determining the nadir data sample value for the period as the least of the minimum data sample values from steps (1) and (2).

8. The method of claim 7, further comprising moving the window to the next period and repeating steps (1) through (3) for the next period.

9. The method of claim 1, wherein determining an amplitude of the baseband signal for each of the plurality of periods of the carrier signal comprises:
    determining a peak data sample value and a nadir data sample value for each of the plurality of periods of the carrier signal;
    determining a peak-to-peak amplitude of the AM signal in each period as a difference between the peak data sample value and the nadir data sample value; and
    determining the amplitude of the baseband signal in each period as ½ of the peak-to-peak amplitude of the AM signal in each period.

10. The method of claim 1, wherein determining an amplitude of the baseband signal for each of the plurality of periods of the carrier signal comprises:
    measuring the carrier frequency from the AM signal;
    determining a peak data sample value for a first one of the periods of the carrier signal; and
    sampling the AM signal at a plurality of times each corresponding to an integer number of periods after a time of the peak data sample value for the first one of the periods.

11. The method of claim 1, wherein determining an amplitude of the baseband signal for each of a plurality of periods of the carrier signal comprises determining a root mean square (RMS) value of the samples in each of the plurality of periods of the carrier signal, and determining the amplitude of the baseband signal based on the RMS value.

12. The method of claim 1, wherein determining an amplitude of the baseband signal for each of a plurality of periods of the carrier signal comprises, for at least some of the periods when the amplitude of the baseband signal is less than a threshold value:
    sampling the AM signal one carrier period away from another time when the AM signal is sampled, to produce an extrapolated data sample, and
    employing the extrapolated data samples to determine the amplitude of the baseband signal for the periods when the amplitude of the baseband signal is less than the threshold value.

13. An apparatus, comprising:
    a digitizer configured to receive an amplitude modulated (AM) signal comprising a baseband signal, having a baseband waveform, modulating a carrier signal, and further configured to sample the AM signal at a sampling rate to produce a plurality of data samples for each period of the carrier signal; and
    a signal processor configured to determine an amplitude of the baseband signal for each of a plurality of periods of the carrier signal from at least some of the plurality of data samples for each period, and to reconstruct the baseband waveform from the amplitudes of the baseband signal for each of the plurality of periods of the carrier signal.

14. The apparatus of claim 13, wherein the digitizer comprises an analog-to-digital converter.

15. The apparatus of claim 13, further comprising at least a first memory device configured to store the data samples output by the digitizer, wherein the signal processor is configured to retrieve the data samples from the memory for processing by the signal processor to determine the amplitude of the baseband signal for each of the plurality of periods of the carrier signal.

16. The apparatus of claim 15, further comprising:
a second memory device configured to store display data representing the reconstructed baseband waveform; and
a display device configured to display the reconstructed baseband waveform.

17. The apparatus of claim 16, wherein the signal processor includes:
an acquisition memory manager configured to manage the first memory device; and
a processing unit configured to process the data stored in the second memory device for display by the display device.

18. The apparatus of claim 13, wherein the signal processor comprises at least one of:
a central processing unit (CPU) and an associated memory configured to store instructions to cause the CPU to execute an algorithm, the algorithm comprising:
determining an amplitude of the baseband signal for each of a plurality of periods of the carrier signal from at least some of the plurality of data samples for each period;
reconstructing the baseband waveform from the amplitudes of the baseband signal for each of the plurality of periods of the carrier signal; and
an integrated circuit configured to determine an amplitude of the baseband signal for each of a plurality of periods of the carrier signal from at least some of the plurality of data samples for each period, and to reconstruct the baseband waveform from the amplitudes of the baseband signal for each of the plurality of periods of the carrier signal.

19. The apparatus of claim 18, wherein determining an amplitude of the baseband signal for each of the plurality of periods of the carrier signal comprises determining at least one of a peak data sample value and a nadir data sample value for each of the plurality of periods of the carrier signal.

20. The apparatus of claim 19, wherein determining at least one of a peak data sample value and a nadir data sample value for each of the plurality of periods of the carrier signal comprises determining the peak data sample by:
(1) determining a maximum data sample value among samples within a window comprising a percentage of the data samples for one of the periods of the carrier signal;
(2) moving the window within the period and repeating step (1) so long as all data sample values are above a DC value of the AM signal; and
(3) determining the peak data sample value for the period as the greatest of the maximum data sample values from steps (1) and (2).

21. The apparatus of claim 19, wherein determining at least one of a peak data sample value and a nadir data sample value for each of the plurality of periods of the carrier signal comprises determining the nadir data sample by:
(1) determining a minimum data sample value among data samples within a window comprising a percentage of the data samples for one of the periods of the carrier signal;
(2) moving the window within the period and repeating step (1) so long as all data sample values are less than a DC value of the AM signal; and
(3) determining the nadir data sample value for the period as the least of the minimum data sample values from steps (1) and (2).

22. The apparatus of claim 19, wherein determining at least one of a peak data sample value and a nadir data sample value for each of the plurality of periods of the carrier signal comprises determining both the peak data sample and the nadir data sample by:
(1) determining a maximum data sample value and a minimum data sample value among samples within a window comprising a percentage of the data samples for one of the periods of the carrier signal;
(2) moving the window within the period and repeating step (1);
(3) determining the peak data sample value for the period as the greatest of the maximum data sample values from steps (1) and (2); and
(4) determining the nadir data sample value for the period as the least of the minimum data sample values from steps (1) and (2).

23. The apparatus of claim 18, wherein determining an amplitude of the baseband signal for each of the plurality of periods of the carrier signal comprises:
determining a peak data sample value and a nadir data sample value for each of the plurality of periods of the carrier signal;
determining a peak-to-peak amplitude of the carrier in each period as a difference between the peak data sample value and the nadir data sample value; and
determining the amplitude of the baseband signal in each period as ½ of the peak-to-peak amplitude of the carrier.

24. The apparatus of claim 18, wherein determining an amplitude of the baseband signal for each of the plurality of periods of the carrier signal comprises:
measuring the carrier frequency;
determining a peak data sample value for a first one of the periods of the carrier frequency; and
sampling the AM signal at a plurality of times each corresponding to an integer number of periods after a time of the peak data sample value for the first one of the periods.

25. The apparatus of claim 18, wherein determining an amplitude of the baseband signal for each of a plurality of periods of the carrier signal comprises determining a root mean square (RMS) value of the data samples in each of the plurality of periods of the carrier signal, and determining the amplitude of the baseband signal based on the RMS value.

26. The apparatus of claim 18, wherein determining an amplitude of the baseband signal for each of a plurality of periods of the carrier signal comprises, for at least some of the periods when the amplitude of the baseband signal is less than a threshold value:
sampling the AM signal one carrier period away from another time when the AM signal is sampled, to produce an extrapolated data sample, and
employing the extrapolated data samples to determine the amplitude of the baseband signal for the periods when the amplitude of the baseband signal is less than the threshold value.

* * * * *